United States Patent [19]

Testerman

[11] Patent Number: 4,549,747
[45] Date of Patent: Oct. 29, 1985

[54] FIFTH WHEEL LIFTER/PROTECTOR

[75] Inventor: Reeves E. Testerman, Bellefontaine, Ohio

[73] Assignee: The United States of America as represented by the Secretary of the Department of Transportation, Washington, D.C.

[21] Appl. No.: 500,057

[22] Filed: Jun. 1, 1983

[51] Int. Cl.[4] .............................................. B60D 7/02
[52] U.S. Cl. ................................ 280/446 R; 172/255; 224/42.08
[58] Field of Search ........... 280/446 R, 446 A, 446 B; 224/42.08; 172/255

[56] References Cited

U.S. PATENT DOCUMENTS

| 920,978 | 5/1909 | Moreau | 172/255 |
| 2,546,192 | 3/1951 | Kurtz | 172/255 |
| 3,458,073 | 7/1969 | Dawson | 224/42.08 X |
| 3,760,965 | 9/1973 | Chandler | 224/42.08 X |

Primary Examiner—Joseph F. Peters, Jr.
Assistant Examiner—Charles R. Watts
Attorney, Agent, or Firm—Otto M. Wildensteiner; Harold P. Deeley

[57] ABSTRACT

A device for protecting a fifth wheel in case the vehicle to which it is attached spins out or backs up for a considerable distance. The device comprises a pair of rods which project rearwardly and downwardly from the bracket mounted on the vehicle; when the vehicle backs up or spins out and the fifth wheel is moved through a horizontal arc toward the rear of the vehicle, its tongue rides up onto one of the rods and is lifted off the ground. When it is out of contact with the ground it can no longer be moved toward the vehicle.

6 Claims, 2 Drawing Figures

4,549,747

FIFTH WHEEL LIFTER/PROTECTOR

STATEMENT OF GOVERNMENT INTEREST

The present invention may be manufactured by or for the Government of the United States without the payment of any royalties thereon or therefor.

BACKGROUND

A fifth wheel is a device that is mounted on the rear bumper of a vehicle and is used to make very accurate measurements of the speed and distance travelled of the vehicle. It comprises a very accurate and sensitive speedometer and odometer driven by a large bicycle wheel; since it is not used for long distance measurements it does not have to be very rugged or durable. Therefore durability is sacrificed for accuracy, and the cost is correspondingly higher than the cost of the speedometer that is in the car; some fifth wheels cost about $2,000 each.

As long as the vehicle undergoes just straight line testing there is no problem with the fifth wheel. A problem arises, however, when the vehicle is backed up for more than a short distance or spins out in the course of a test. Under these conditions the fifth wheel is moved in a horizontal arc relative to the rear of the vehicle and if the arc is large enough will slam into the rear of the vehicle; this results in severe damage to the fifth wheel, and can also inflict slight damage to the sheet metal of the vehicle.

Solving the above problem by merely limiting the horizontal travel of the fifth wheel is not practical because if this is done, the wheel will be locked in position at an angle to the vehicle and will be skidded along behind it. This will at the minimum wear the tire in one spot, causing a flat spot on it, and may result in the wheel itself being bent out of shape. Furthermore, it will not allow the fifth wheel to exactly follow the vehicle through tight turns and will thus reduce the accuracy of the test. What is needed is a simple, reliable way of preventing damage to the fifth wheel under the above circumstances.

OBJECTS OF THE INVENTION

Accordingly, it is an object of the present invention to provide a means of preventing damage to a fifth wheel tester when the vehicle to which it is attached is backed up or spun out.

It is a further object to provide such a means which is simple and reliable.

It is a further object to provide such a means which has no moving parts.

It is a further object to provide such a means which is adaptable to any vehicle and any fifth wheel.

SUMMARY

Briefly, the present invention is a means of protecting a fifth wheel when the vehicle to which it is attached backs up more than a short distance or spins out during testing. It comprises a pair of rods attached to the bracket which mounts the wheel to the vehicle's bumper, one on each side of the bracket. The rods project rearwardly and downwardly; when the wheel is swung to either side through a horizontal arc the tongue of the fifth wheel unit rides up onto the rod on that side, lifting the wheel off the ground. Once out of contact with the ground the wheel stays immobilized on the rod until it is manually removed and placed in line with the vehicle again.

DESCRIPTION OF THE PREFERRED EMBODIMENT

Figure 1:
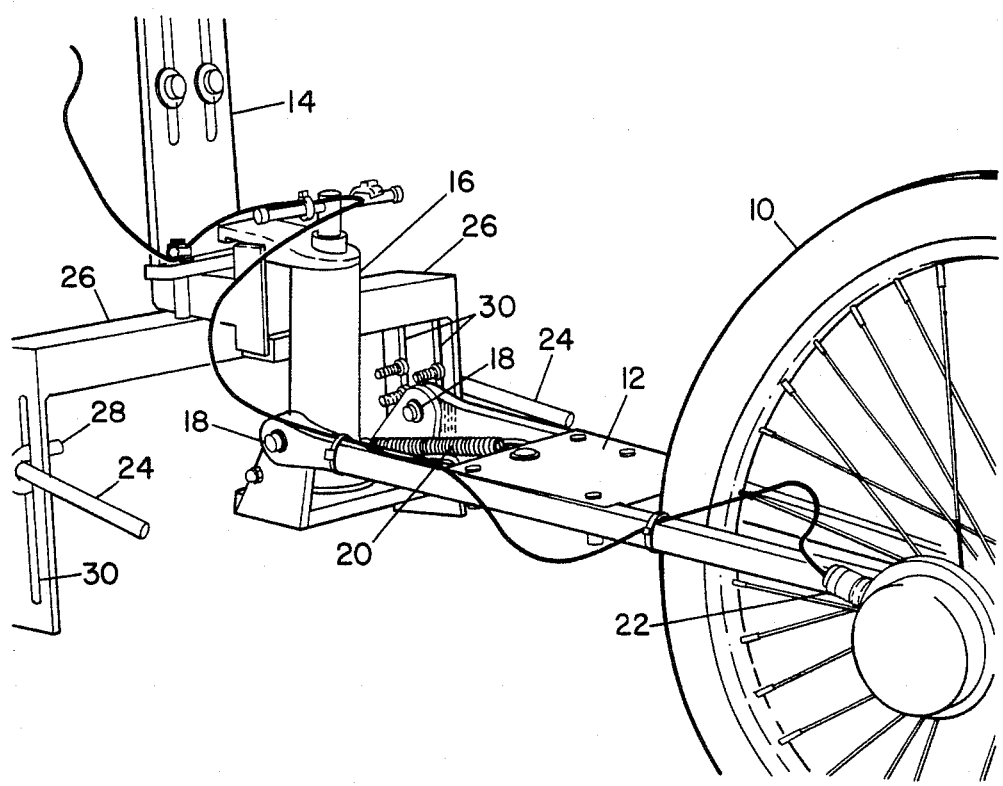
FIG. 1 shows a fifth wheel mounted on a vehicle with the fifth wheel in line with the vehicle.

FIG. 1 shows an exemplary fifth wheel tester attached to a vehicle (in this case a large truck). It comprises a bicycle wheel 10 mounted on tongue 12 which is mounted on bracket 14. Tongue 12 is connected to bracket 14 by means of pivot 16, which allows it to move through a horizontal arc, and pivots 18, which allow it to move through a vertical arc. Bracket 14, pivot 16, and pivots 18 comprise an assembly generally known as a "hitch" or "trailer hitch" since they are the minimum components required to attach or hitch a trailing device to a pulling vehicle. It is necessary that tongue 12 be able to pivot horizontally and vertically so that wheel 10 will follow the vehicle to which it is attached and remain in contact with the road at all times. Tongue 12 is biased toward the ground by means of spring 20. Attached to tongue 12 is transducer 22, which is rotated by wheel 10 and which provides the indication of velocity/distance travelled by the vehicle.

The present invention comprises members or rods 24 which are attached to extensions 26 of mounting bracket 14. As can be seen, rods 24 extend longitudinally and are attached to extensions 26 by means of U-bolts 28 which can be moved vertically in slots 30; this allows the rods to be used on vehicles having different bumper heights. The exact size and shape of rods 24 and extensions 26 are not critical; it is only necessary that they be strong enough to perform their intended functions, and that rods 24 be in a position to intercept tongue 12 before it swings far enough to cause damage to wheel 10. The placement of rods 24 is also not critical; all that is necessary is that they be far enough to the sides to allow wheel 10 to follow the vehicle through its normal maneuvers, yet raise it up whenever the vehicle spins out or backs up.

It will be seen that there is a pair of rods 24 and that they extend longitudinally to the rear and slope down toward the ground. They thus form surfaces that will lift tongue 12 up whenever it is forced onto them; there is one rod 24 on each side of bracket 14 so that tongue 12 will contact a rod 24 whenever it swings too far in either horizontal direction.

Figure 2:
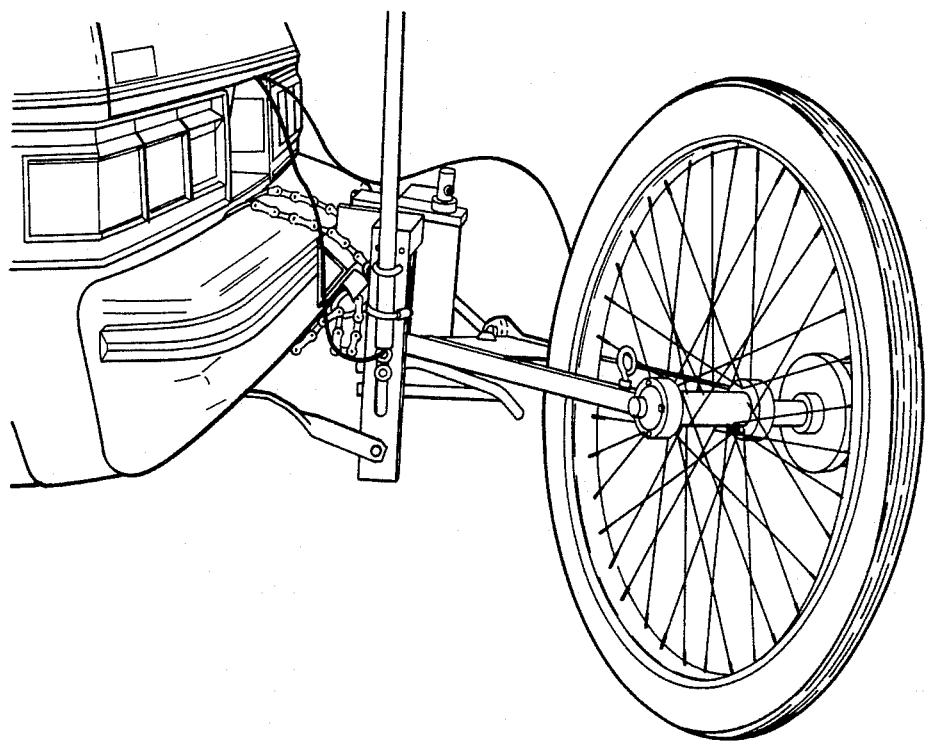
FIG. 2 shows a fifth wheel that has been swung to one side.

FIG. 2 shows the assembly (in this case mounted on a passenger car) after wheel 10 has moved through a large horizontal arc and been lifted off the ground. Since wheel 10 is not in contact with the ground it will not move no matter what the vehicle does. In order to resume testing it will be necessary for wheel 10 to be manually lifted up off the rod and placed on the ground in line with the vehicle.

Operation of the device is as follows. As long as the vehicle is moving in a straight line the fifth wheel follows directly behind it with no problems. When the vehicle makes a turn, pivot 16 allows the fifth wheel to follow the vehicle exactly. However, if the vehicle were to execute a violent maneuver which causes its rear wheels to lose traction and allow the vehicle to spin, the fifth wheel will no longer follow directly behind the vehicle; it will be slammed against the rear of the vehicle, with consequent damage to the fifth wheel and possibly to the vehicle also. With applicant's device in place, however, when tongue 12 reaches the rod on that side of the bracket the rod causes tongue 12 to be lifted up which lifts wheel 10 off the ground. Once wheel 10 is off the ground there is no more force on it, hence it is not slammed into the rear of the vehicle. After the vehicle comes to rest, the operator or some other person manually lifts tongue 12 off the rod and places wheel 10 back on the ground behind the vehicle; the fifth wheel unit is then ready to work again.

A fifth wheel is also subject to damage if the vehicle is backed up for more than just a short distance. Since the fifth wheel is in reality a trailer, it will react to the movements of the vehicle's steering wheel the same way as a trailer. That is, if the steering wheel is turned in either direction the fifth wheel will turn to the opposite side of the vehicle; if the vehicle is backed up for several feet, the fifth wheel will be forced to the limit of its horizontal arc and the bicycle wheel will be skidded sideways against the ground. As stated earlier, if this is done rather gently the only damage will be a flat spot ground on one side of the tire; if done quickly, the fifth wheel could be slammed against the rear of the vehicle with considerably more damage done to it. Applicant's rods, however, will contact tongue 12 and raise it up, thereby lifting bicycle wheel 10 off the ground and preventing damage.

Although the trailer hitch shown in the figures is a rather complex hitch, the invention will obviously work with the conventional "ball" hitch also. For this configuration the horizontal and vertical pivots are integral with the ball, rather than being separate units as shown. Rods 24 will be placed on each side of the ball just as shown in the figures, and the tongue of a trailer that is placed on the ball will be raised under the same conditions as described above.

What is claimed is:

1. In a trailer hitch for attaching a ground-supported device to a vehicle, said device being supported by wheel means engaging the ground during forward travel of said vehicle and having a longitudinally extending tongue which is attached to said hitch, said hitch having provisions for allowing said tongue to pivot in the horizontal and vertical directions, the improvement which comprises: means for raising said device including said wheel means entirely off the ground when said tongue has pivoted beyond a certain point in the horizontal direction.

2. A trailer hitch as in claim 1 wherein said means for raising said device comprises longitudinally extending members attached to said hitch.

3. A trailer hitch as in claim 2 wherein said longitudinally extending members slope toward the ground.

4. A trailer hitch as in claim 3 wherein said longitudinally extending members extend to the rear of said hitch.

5. A trailer hitch as in in claim 4 wherein said longitudinally extending members comprise a pair of members, one on either side of said tongue.

6. A trailer hitch as in claim 5 wherein said longitudinally extending members are laterally offset from the centerline of said hitch.

* * * * *